United States Patent [19]

Hall et al.

[11] Patent Number: 4,617,833

[45] Date of Patent: Oct. 21, 1986

[54] HIGH PRECISION ADJUSTER

[75] Inventors: Kenneth F. Hall; George Chambers, both of Martock, England

[73] Assignee: Martock Design Limited, Martock, England

[21] Appl. No.: 648,499

[22] Filed: Sep. 10, 1984

[30] Foreign Application Priority Data

Jan. 7, 1984 [GB] United Kingdom ............... 8400352

[51] Int. Cl.[4] ............................................ F16H 21/44
[52] U.S. Cl. ...................................... 74/110; 74/89.15
[58] Field of Search ............................... 74/89.15, 110

[56] References Cited

U.S. PATENT DOCUMENTS

| 2,738,748 | 3/1956 | Hecht | 74/110 |
| 2,829,500 | 4/1958 | Butler | 74/110 |
| 4,073,197 | 2/1978 | Arnold et al. | 74/110 |
| 4,270,398 | 1/1981 | Arnold | 74/110 |
| 4,347,754 | 9/1982 | Wehler | 74/110 |
| 4,387,625 | 6/1983 | Katagiri et al. | 74/110 |

FOREIGN PATENT DOCUMENTS

| 958923 | 9/1949 | France | 74/110 |
| 1295094 | 4/1962 | France | 74/110 |

Primary Examiner—Lawrence Staab
Attorney, Agent, or Firm—Fleit, Jacobson, Cohn & Price

[57] ABSTRACT

A precision linear motion adjuster comprises a body with a primary motion member having a screw-threaded portion in threaded engagement therewith, the primary motion member having a thrust-imparting spigot coaxial with the threaded portion, an output member slidable in said body and an intermediate lever system located within the body for translating a relatively large movement of the primary motion member into a relatively small movement of the output member.

10 Claims, 1 Drawing Figure

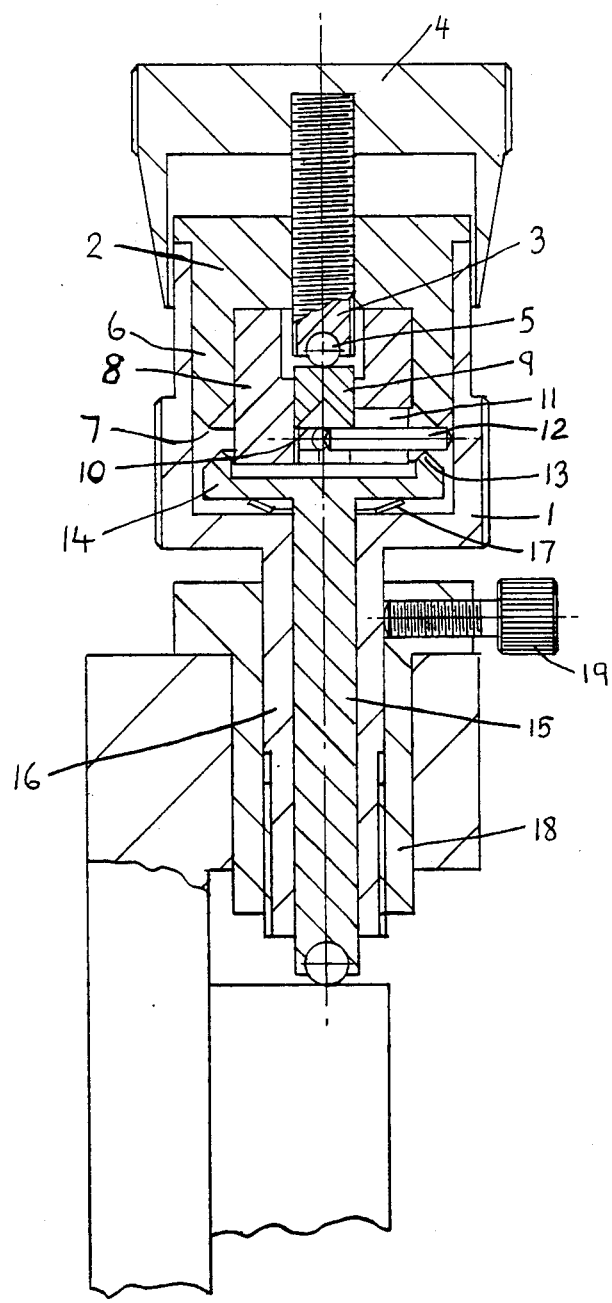

HIGH PRECISION ADJUSTER

This invention relates to high precision mechanical adjusters. Such adjusters are commonplace in instruments such as microscopes and micrometers for example. However, in some fields, such as in opto-electronics and fibre optics alignment, a higher precision than is available by an ordinary screw thread, for example of the order of 0.1 µm, is becoming a requirement.

Such movements have been obtained by the use of differential thread mechanisms but these have several disadvantages, as follows:

a. The axial load on the adjuster, produced either by a spring or by gravity and necessary to eliminate backlash, is taken on the flanks of two screw threads, usually of vee form. Machining defects in either thread, pitch errors and even contaminated lubricants can all produce unwanted axial movement larger in magnitude than the positioning accuracy required.

b. Because the screw threads act directly on the applied load, a change in load, or a large load due to gravity when positioning in the vertical plane, can be felt when operating the adjuster and limit its precision and convenience.

c. The operation of a differential screw mechanism produces an unwanted rotation of some part of the system which must be constrained (i.e. if the control knob is attached to two male threads of differing pitches, the output is via a nut which tends to rotate). The unwanted rotation is normally constrained by a pin in a slot for compactness. However, unless the fit of the pin in the slot and the fit of the associated sliding part on its bearing are perfectly free and yet without clearance, backlash will be present in the system. As a rotation of the control knob of one thousandth of a revolution can be significant, the accuracy required is difficult to achieve and maintain with use.

According to the invention a linear motion adjuster comprises a body with a primary motion member having a screw-threaded portion in threaded engagement therewith, said member having a thrust-imparting spigot coaxial with the threaded portion, an output member slidable in said body and an intermediate lever system located within said body for translating a relatively large movement of the primary motion member into a relatively small movement of the output member.

In a preferred form the primary motion member and the output member are coaxial and the lever system is symmetrically arranged therebetween. The lever system may comprise a set of cups the edges of which form the pivots of a lever in the form of a rod or bar the surface of which is in contact with the said edges, as it extends across them. The edges are preferably chamfered to form knife edge supports for the bar and the bar may be constituted by a ground and hardened cylindrical element such as a roller from a needle type roller bearing. Likewise the actual thrust portions or spigots may be constituted by hardened steel balls such as are used in ball bearings.

An example of a construction according to the invention will now be described in relation to the accompanying drawing in which an adjuster is represented in cross section.

In the drawing a cylindrical body 1 is shaped for the reception, e.g. by a force fit, of a plug member 2 having a concentric bore in which is located the thrust-imparting spigot 3 of a primary motion member 4. In this example the spigot 3 is threaded in the member 2 (although the member 4 itself could be threaded on to an external thread on the body 1) and its thrust surface is constituted by a hardened steel ball 5. The end of the plug 2 is in the form of a cup 6 which is machined to form a circular knife edge 7 which constitutes the fulcrum of a second order lever system. Fitted within the cup 6 is a further plug 8 which has two functions. Firstly, it provides a concentric sliding bearing for a cup 9 which is machined to form a circular knife edge 10, and secondly, it has radial slots, one of which is shown at 11, for retaining three rods 12 which form the levers of the lever system. The levers 12 are arranged equidistantly around the interior of the body 1 and have rounded ends, their length being such that while they are free to move angularly they have virtually no play endwise, since in operation they depart very little from the transverse position shown.

Rotation of the primary motion member 4 will cause axial movement of the threaded spigot 3 and the ball 5 will transmit this to the cup 9 causing movement of the inner ends of the levers 12. This movement is transmitted in reduced form by means of a circular knife edge 13 of a cup 14 which forms part of a coaxial output member 15 arranged to slide in a bore of an extension 16 of the body 1.

It will be apparent that a spring return or its equivalent is desirable to bias the system to eliminate any operational play and this may be provided externally by the element the system is arranged to move. An additional spring bias may be provided by a spring washer 17 located between the body 1 and the under side of the cup 14. The extension 16 may be mounted as shown in a zeroing sleeve 18 into which it is threaded, and a locking screw 19 may be provided.

In the example shown the mechanical advantage of the lever system is about 6:1 and by suitable choice of the radius at which the knife edges are formed this can be varied between wide limits. Moreover, since the radius of each of the pivots is determined by turning operations on coaxial parts, great accuracy can be obtained at relatively low cost.

For the kind of movement involved only a few turns of the primary motion member is required, and limit stops (not shown) may be used to ensure that this is not exceeded.

Among the advantages obtained by the invention are that the use of a lever reduction system results in a lower load on the operating screw thread (the axial load being taken mainly on the fixed lever pivot), in the effects of load variation being less felt, in the effects of errors or defects in the screw thread being reduced by the lever ratio, and since only one screw thread is used compared with two in a differential screw mechanism a smoother and more effortless operation is obtained. Moreover, since the thrust of the member 4 is conveyed to the sliding cup 9 through a very small area at its centre, there is little tendency for the latter to rotate, so no keying is required.

With the construction described, the ratio of the lever system can be readily varied by choosing suitable radii for the pivot points formed by the turned parts, and it is an easy matter to construct a device according to the invention with two lever systems in series, so that the ratio of the first is multiplied by the ratio of the second.

We claim:

1. A high precision linear motion adjuster comprising: a body having an axis, a primary motion member having a screw-threaded portion in threaded engagement with said body, said member having a thrust-imparting spigot coaxial with said axis and with the threaded portion, an output member slidable in said body, and an intermediate lever system located within said body and positioned between said spigot and output member, said lever system including at least one substantially straight lever extending transversely of said axis, said lever pivotable about a fulcrum carried by said body and effective to translate through radially fixed pivots a relatively large movement of the primary motion member into a relatively small movement of the output member.

2. A mechanism according to claim 1 wherein the primary motion member and the output member are coaxial and the lever system is symmetrically arranged around the axis therebetween.

3. A mechanism according to claim 2 wherein the lever system comprises a set of coaxial cups each having an edge to form the pivot of a lever in the form of a rod or bar which lies in contact with said edges as the lever extends across them.

4. A high precision linear motion adjuster comprising: a body with a primary motion member having a screw-threaded portion in thread engagement therewith, said member having a thrust-imparting spigot coaxial with the threaded portion, an output member slidable in said body and coaxial with said spigot, and an intermediate lever system symmetrically arranged around an axis between the primary motion member and the output member and including a set of coaxial cups each having an edge to form the pivot of a lever in the form of a rod or bar which lies in contact with said edges as the lever extends across them, a large diameter cup being fixed within said body and having a movable drive cup within it which is urged linearly of said body to effect the adjustment by the spigot of the primary motion member, while a third cup has an edge of intermediate diameter facing towards the first two cups an serving as an output member.

5. A high precision linear motion adjuster comprising: a body with a primary motion member having a screw-threaded portion in threaded engagement therewith, said member having a thrust-imparting spigot coaxial with the threaded portion, an output member slidable in said body and coaxial with said spigot, and an intermediate lever system located within said body effective to translate a relatively large movement of the primary motion member into a relatively small movement of the output member, said lever system including at least one transverse lever having a fulcrum on an edge of a large diameter fixed cup within said body and operating on a corresponding edge of a lesser diameter output cup extending from the output member, a drive cup slidable axially within the fixed cup, the lever located in a radial guide slot in a guide member which is fitted in a counterbore in the fixed cup, and the guide member has a coaxial bore in which the drive cup slides, the inner end of said lever being movable axially by contacting said drive cup with said spigot to effect adjustment of said output member.

6. A high precision linear motion adjuster according to claim 5 wherein the diameter of the edge of the output cup is close to that of the fixed cup so as to provide a large mechanical advantage.

7. A high precision linear motion adjuster comprising: a body having an axis, a primary motion member having a screw-threaded portion in threaded engagement with said body, said member having a thrust-imparting spigot coaxial with said axis and with the threaded portion, a coaxial output member slidable in said body, and an intermediate lever system symmetrically arranged around said axis and located within said body and positioned between said spigot and said output member, said lever system including a plurality of coaxial cups each having edges to form pivots for one of a plurality of levers including radially arranged rods extending across and lying in contact with said edges, said cups having chamfered edges to form knife-edge bearings for the radially arranged rods.

8. A high precision linear motion adjuster according to claim 7, wherein a large diameter cup is fixed within said body and has a movable drive cup within it which is urged linearly of said body to effect the adjustment by the spigot of the primary motion member, while a third cup has an edge of intermediate diameter facing towards the first two cups and serves as an output member.

9. A high precision linear motion adjuster according to claim 8, wherein the diameter of the edge of the third cup is close to that of the fixed cup, while that of the drive cup is relatively small so as to provide a large mechanical advantage.

10. A high precision linear motion adjuster according to claim 9 wherein the rods are located in radial guide slots in a guide member which is fitted in a counterbore in the fixed cup, and has a coaxial bore in which the drive cup slides.

* * * * *